(12) United States Patent
Chang

(10) Patent No.: US 11,305,452 B1
(45) Date of Patent: Apr. 19, 2022

(54) POWER MITER SAW HAVING BEVEL LOCK MECHANISM

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 17/329,363

(22) Filed: May 25, 2021

(51) Int. Cl.
  *B27B 5/36* (2006.01)
  *B27B 5/20* (2006.01)
(52) U.S. Cl.
  CPC ............... *B27B 5/36* (2013.01); *B27B 5/206* (2013.01)
(58) Field of Classification Search
  CPC ............ B27B 5/206; B27B 5/36; B27B 5/201
  USPC ........................................................ 83/471.3
  See application file for complete search history.

(56) References Cited

U.S. PATENT DOCUMENTS

| | | | | |
|---|---|---|---|---|
| 5,517,763 | A * | 5/1996 | Schilling | B27B 9/02 30/376 |
| 10,434,588 | B1 * | 10/2019 | Chang | B27B 5/29 |
| 2004/0089125 | A1 * | 5/2004 | Schoene | B27B 27/04 83/471.3 |
| 2019/0291193 | A1 * | 9/2019 | Chang | B27B 5/32 |

* cited by examiner

*Primary Examiner* — Omar Flores Sanchez

(57) ABSTRACT

A power miter saw includes a turntable being rotatable on a base; a bevel post secured to a support assembly and pivotably connected to the base, the bevel post including a stepped-diameter channel, a structural member, and a complementary member; a curved graduated board disposed on the turntable and including spaced apertures; a shaft including an enlargement proximate a head, and a threaded end, the shaft inserted through the channel with the head disposed in the aperture; a biasing member put on the shaft and anchored in the channel; and an activation handle including a rod configured to pivotably move between a first position of the structural member and a second position of the structural member, a pivot hole with the threaded end passing through, and a projection engaged with the complementary member in a locked position; and an adjustable nut secured to the threaded end.

4 Claims, 14 Drawing Sheets

POWER MITER SAW HAVING BEVEL LOCK MECHANISM

BACKGROUND OF THE INVENTION

1. Field of the Invention

The invention relates to miter saws and more particularly to a power miter saw having an improved bevel lock mechanism.

2. Description of Related Art

U.S. Pat. No. 9,849,605 to Chang discloses a power miter saw comprising a base assembly including a frame, cavities on a bottom of the frame, two supports at two sides of the frame respectively, and two parallel sliding rods passing through one support; a table assembly including a rotatable table mounted on the frame, a miter arm secured to the rotatable table, and a fence at an edge of the rotatable table and secured to the supports; and a saw blade and motor assembly. The fence includes a central curved top, two platforms at two ends of the central curved top respectively, two shoulders each at a joining portion of the curved top and the adjacent platform, and two aligned grooved members each extending outward from a position proximate the platform. The platforms are at an elevation greater than that of the miter arm.

While the device enjoys its success in the market, continuing improvements in the exploitation of power miter saw of this type are constantly being sought.

SUMMARY OF THE INVENTION

It is therefore one object of the invention to provide a power miter saw comprising a base; a turntable configured to adjustably rotate on the base; a support assembly configured to support a rotatable circular saw blade disposed in a blade guard; a bevel post secured to the support assembly and pivotably connected to one end of the base, the bevel post including a stepped-diameter channel, a structural member, and a complementary member in the structural member; a curved graduated board disposed on the turntable and including a pointer pointed at a center of a top edge, and a plurality of apertures spaced along the top edge; a shaft having a head and including an enlargement proximate the head, and a threaded end wherein the shaft is inserted through the stepped-diameter channel with the head disposed in one of the apertures; a biasing member put on an intermediate portion of the shaft and having one end urging against a shoulder of the stepped-diameter channel and the other end urging against the enlargement; an activation handle including a rod configured to pivotably move between a first position of the structural member and a second position of the structural member, a pivot hole with the threaded end passing through, and a projection engaged with the complementary member in a locked position; and an adjustable nut threadedly secured to the threaded end.

The above and other objects, features and advantages of the invention will become apparent from the following detailed description taken with the accompanying drawings.

DETAILED DESCRIPTION OF THE INVENTION

Figure 1:
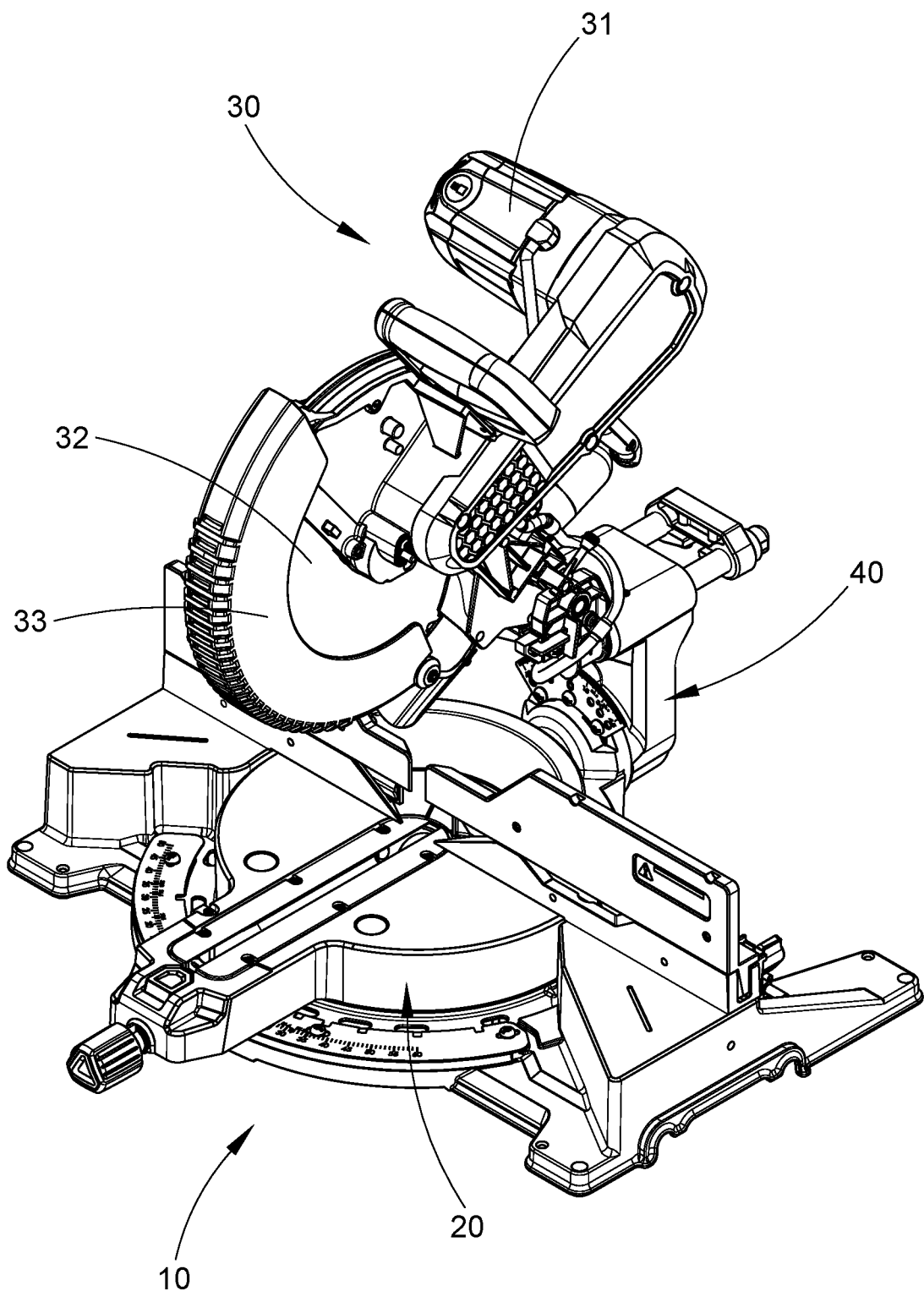
FIG. 1 is a perspective view of a power miter saw according to the invention.
Figure 2:
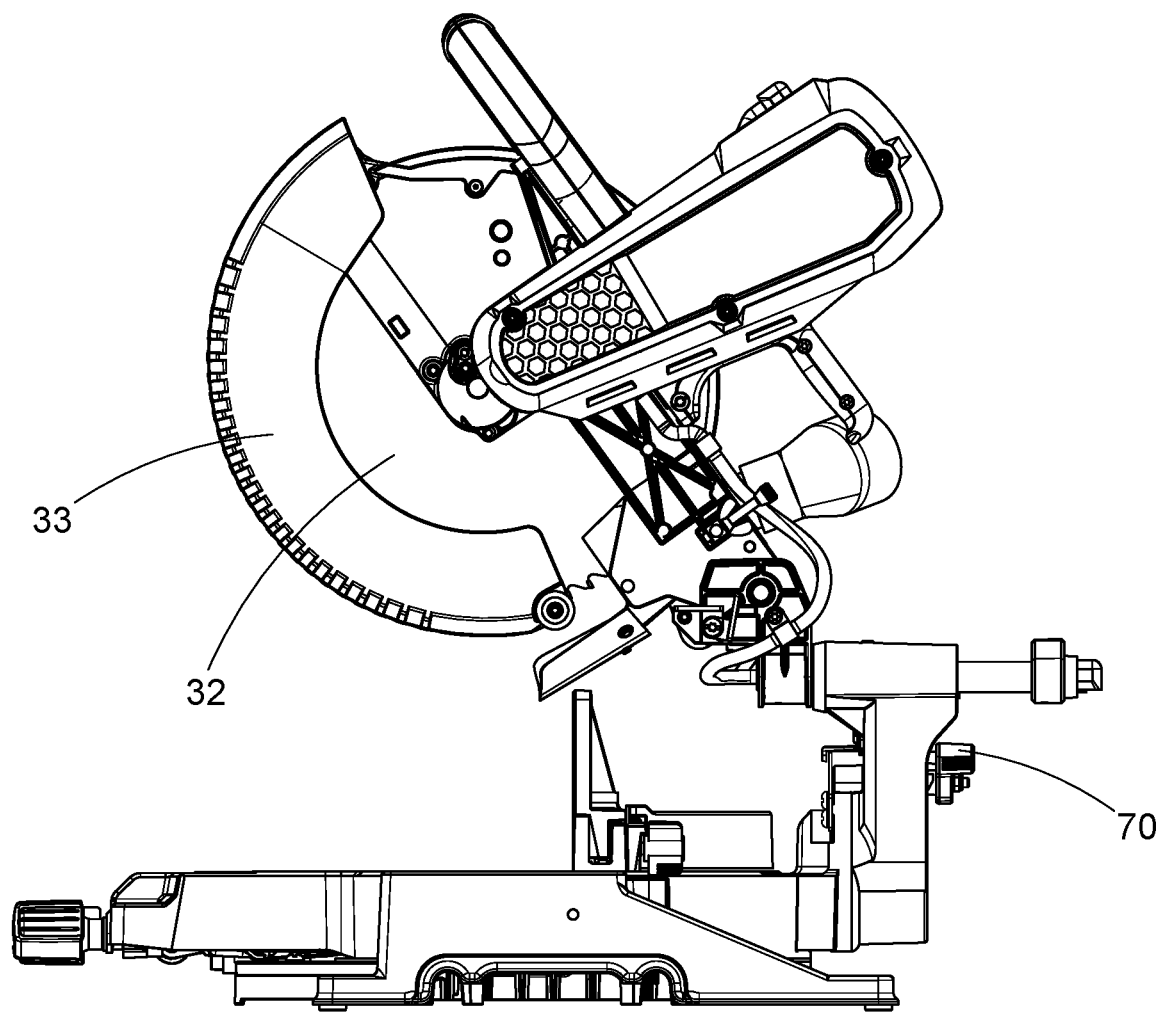
FIG. 2 is a side elevation of FIG. 1.
Figure 3:
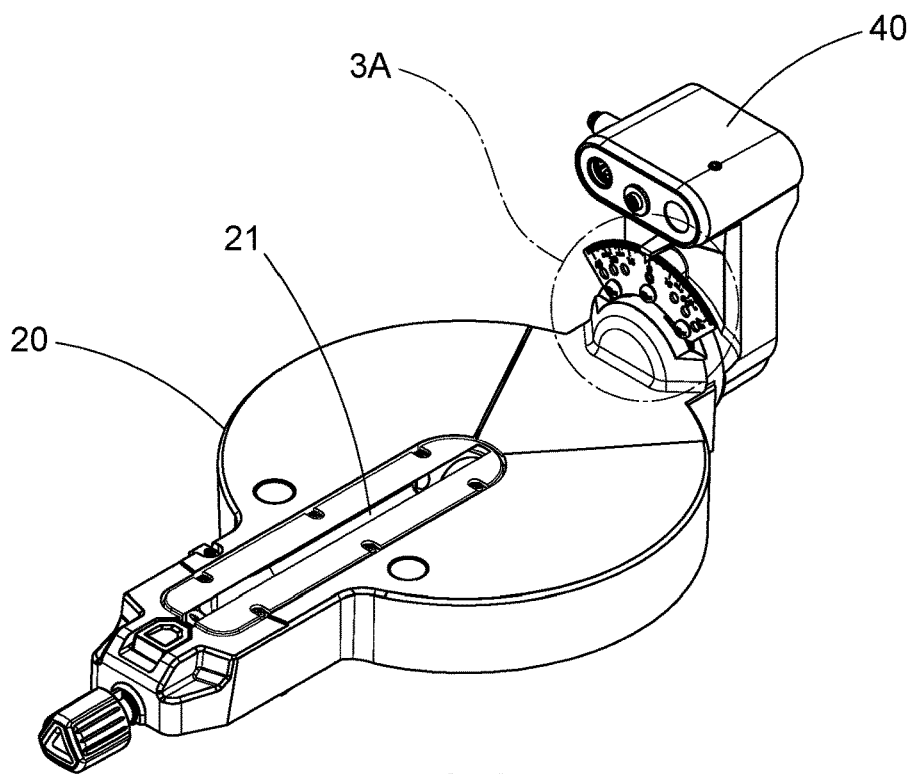
FIG. 3 is a perspective view of the turntable, the graduated board and the bevel post.
Figure 3A:
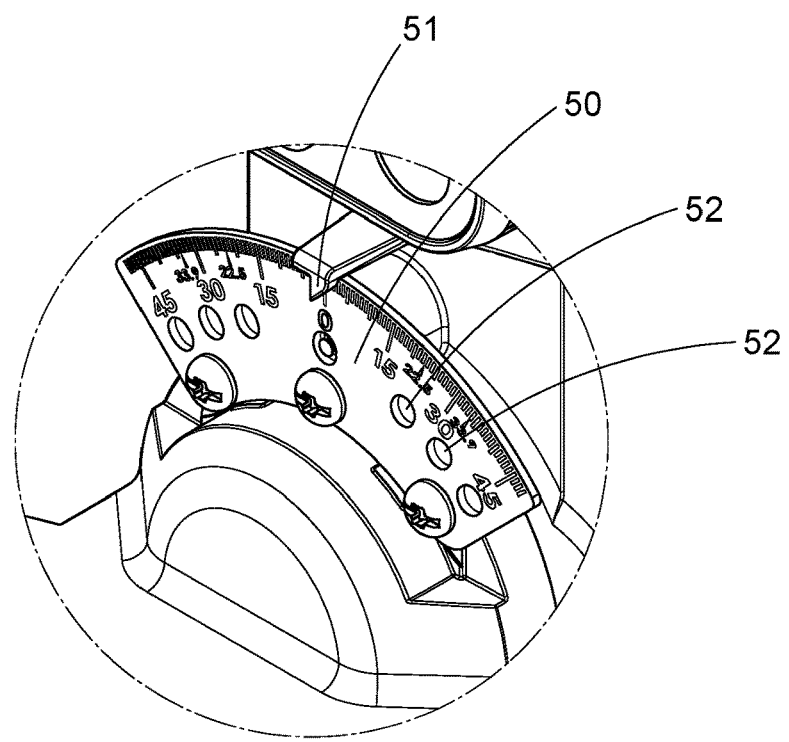
FIG. 3A is a detailed view of the circular area 3A of FIG. 3.
Figure 4:
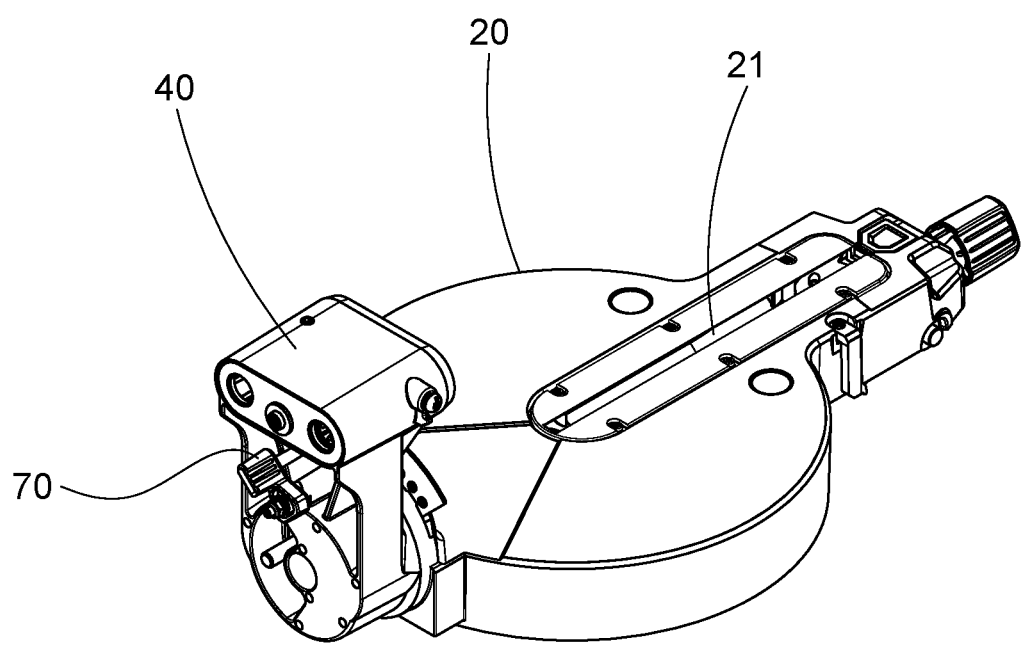
FIG. 4 is an opposite view of FIG. 3.
Figure 5:
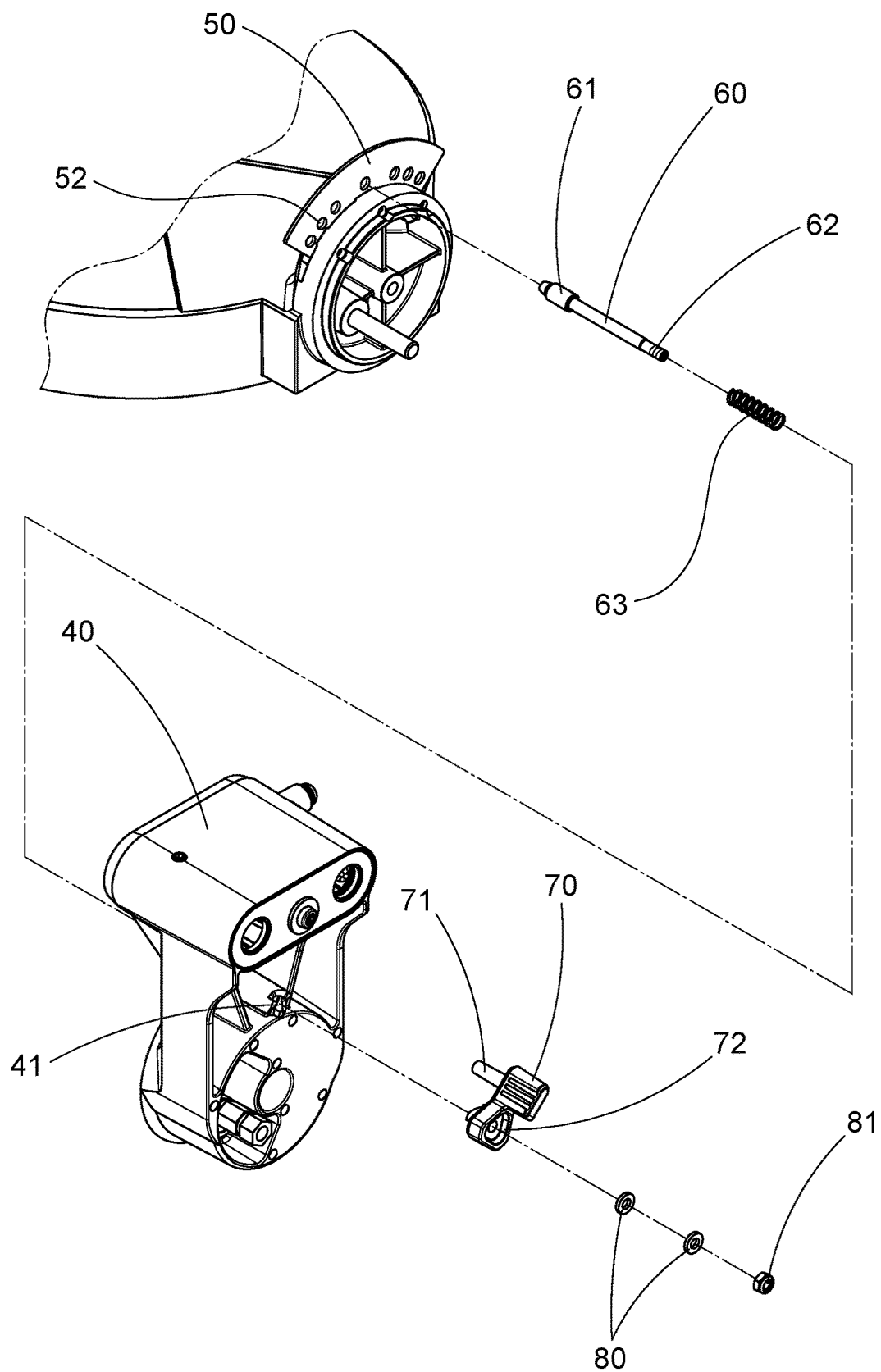
FIG. 5 is an exploded view of the left side of FIG. 4.
Figure 6:
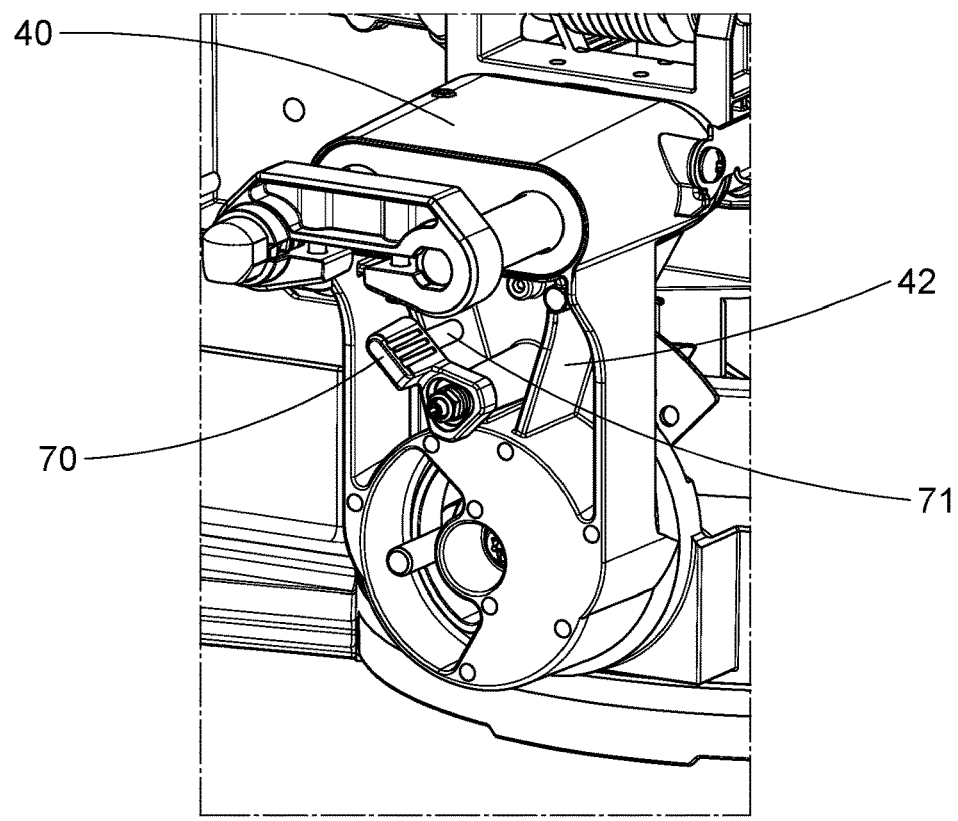
FIG. 6 is an enlarged view of the left side of FIG. 4 where the shaft is in a locked position.
Figure 7:
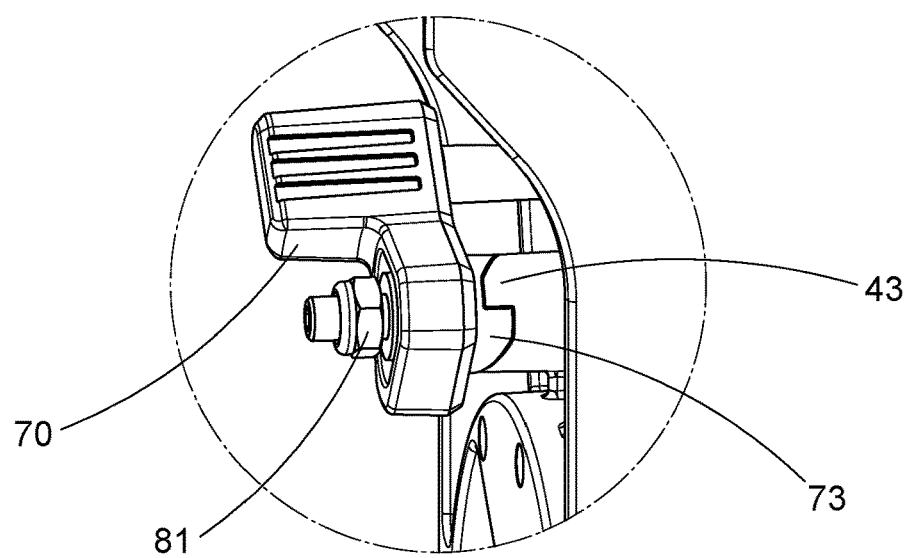
FIG. 7 is an enlarged view of the central portion of FIG. 6.

Referring to FIGS. 1 to 13A, a power miter saw in accordance with the invention comprises the following components as discussed in detail below.

A base 10 is provided. A turntable 20 includes a lengthwise saw blade slot 21 on a support surface of the base 10 and is configured to be adjustably rotatable on the base 10. A support assembly 30 is configured to support a rotatable circular saw blade 32 which is driven by an electric motor 31 and disposed in a blade guard 33. A bevel lock mechanism as the subject of the invention comprises the following components as discussed in detail below.

A bevel post 40 is secured to the support assembly 30 and pivotably connected to one end of the base 10. A curved graduated board 50 is provided on the turntable 20 and includes a pointer 51 pointed at a center of a top edge, and a plurality of apertures 52 spaced along the top edge in an arc configuration.

A shaft 60 has a head and includes an enlargement 61 proximate the head, and a threaded end 62. The shaft 60 is inserted through a stepped-diameter channel 41 of the bevel post 40. A torsion spring 63 is put on an intermediate portion of the shaft 60 and has one end urging against a shoulder 411 of the stepped-diameter channel 41 and the other end urging against the enlargement 61. An activation handle 70 includes a rod 71 configured to pivotably move from a first position of a structural member 42 to a second position of the structural member 42 or vice versa, a pivot hole 72 with the threaded end 62 passing through, and a projection 73 engaged with a complementary member 43 of the bevel post 40 in the locked position. Two washers 80 are put on the shaft 60 proximate the threaded end 62 and positioned in a cavity 73 of the activation handle 70. An adjustable nut 81 is threadedly secured to the threaded end 62 and urges against the outer one of the washers 80. The washers 80 are rotatable mounted on the shaft 60 and are disposed between the cavity 73 and the adjustable nut 81 with gap (e.g., 1.5 mm) or without gap. The adjustable nut 81 may or may not press the washers 80 against the cavity 73. If the gap exists, movement of the activation handle 70 pushes the washers 80 against the adjustable nut 81.

Figure 8:
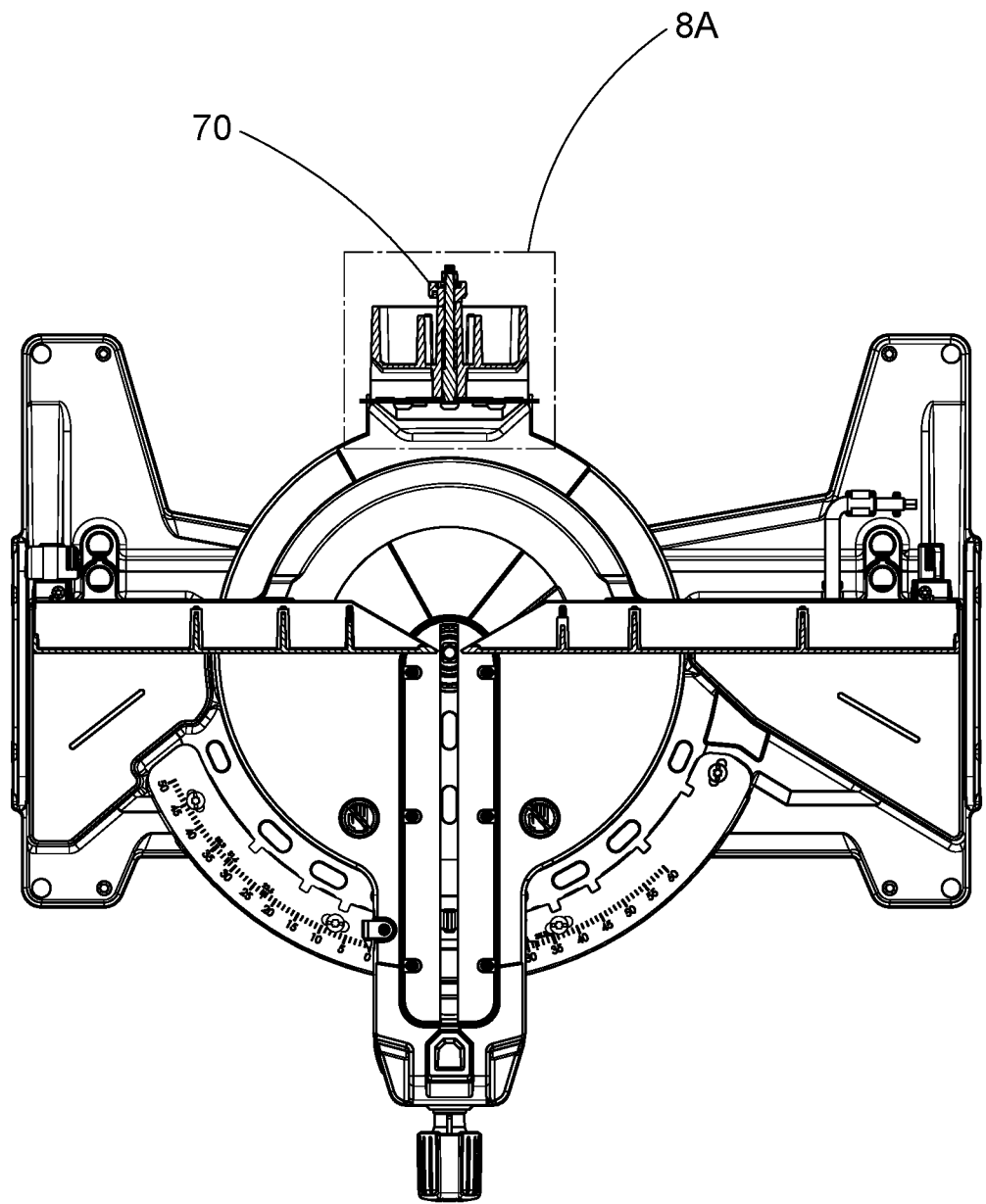
FIG. 8 is a schematic top view of the power miter saw with the support assembly removed and the shaft being in the locked position.
Figure 8A:
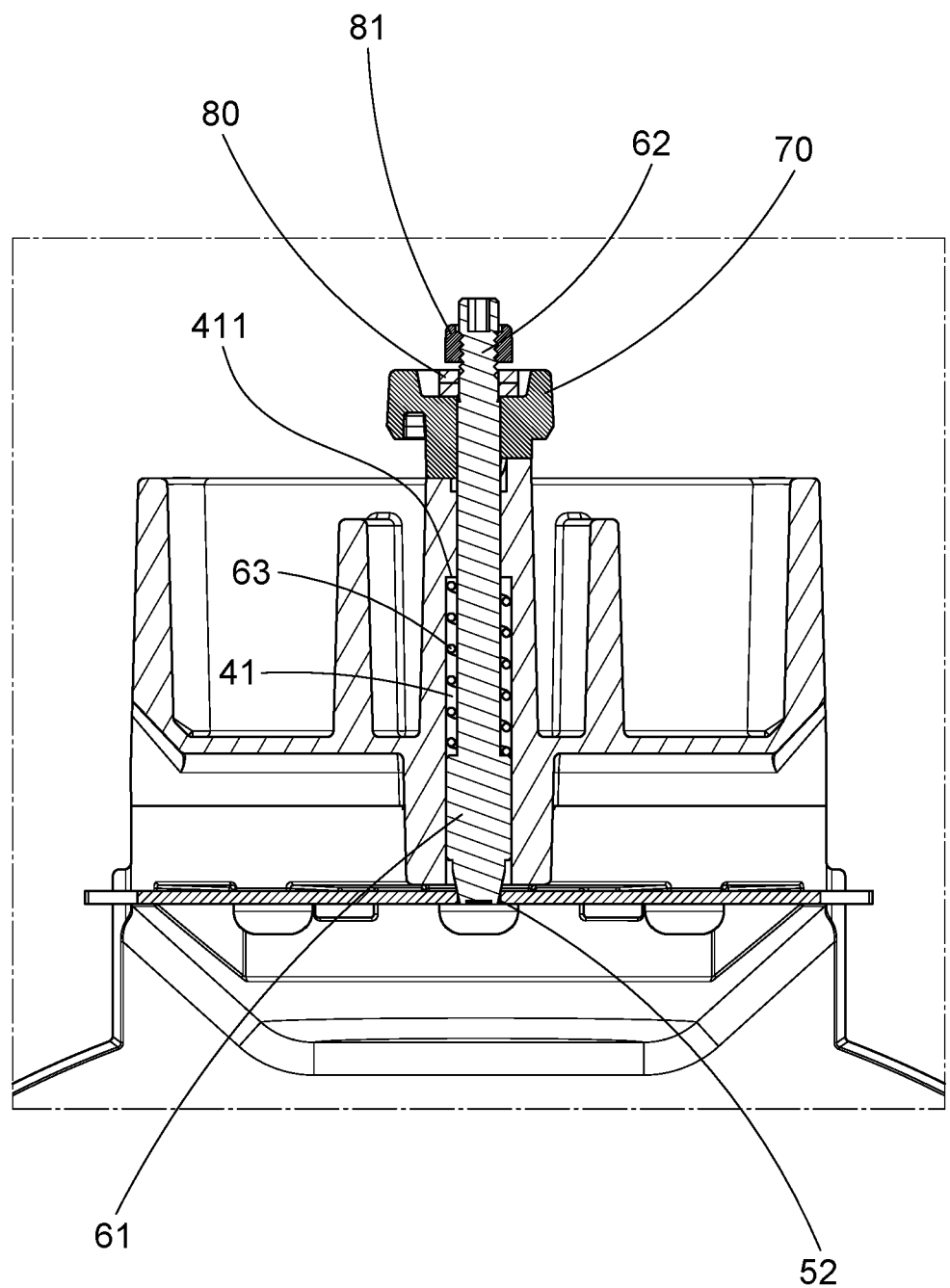
FIG. 8A is a detailed view of the rectangular area 8A of FIG. 8.
Figure 9:
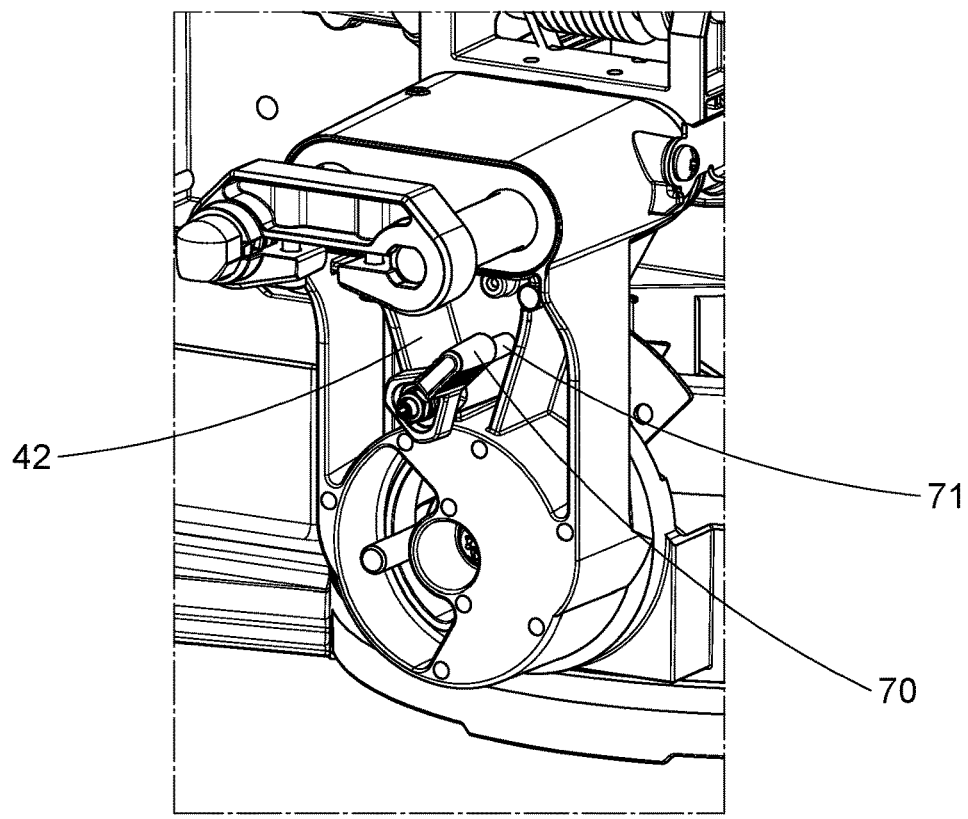
FIG. 9 is a view similar to FIG. 6 where the shaft is in an unlocked position.
Figure 9A:
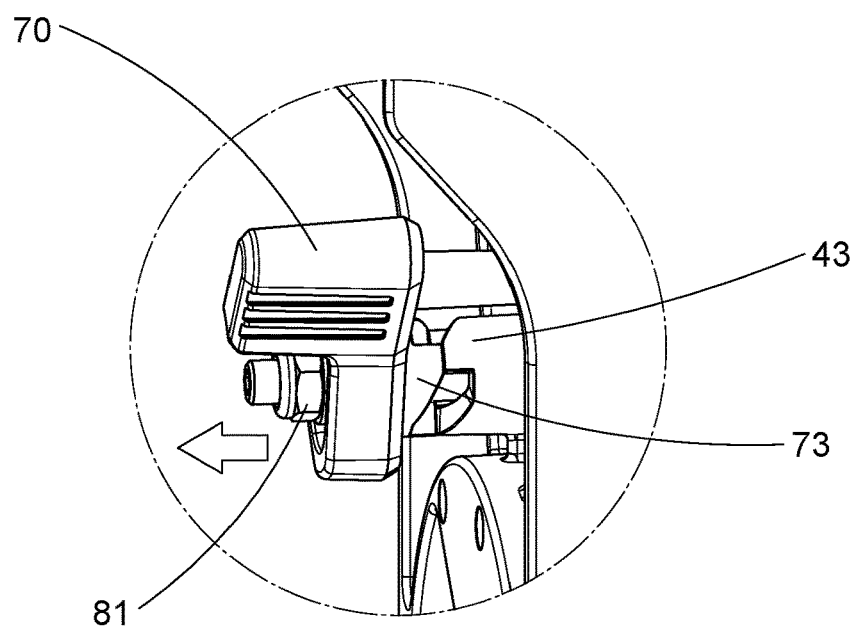
FIG. 9A is an enlarged view of the central portion of FIG. 9 showing the activation handle being pushed away from the bevel post.
Figure 10:
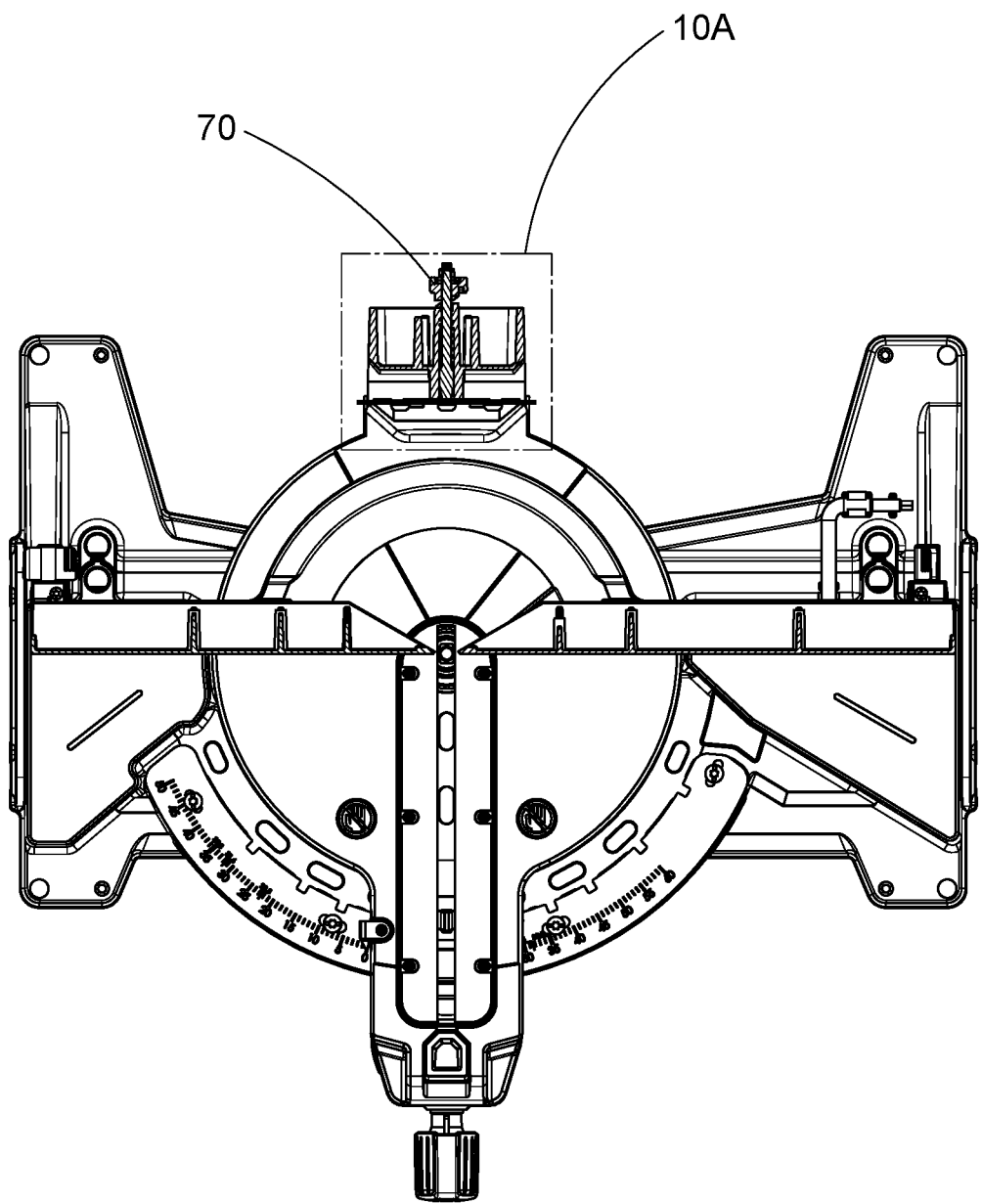
FIG. 10 is a view similar to FIG. 8 where the shaft is in the unlocked position.
Figure 10A:
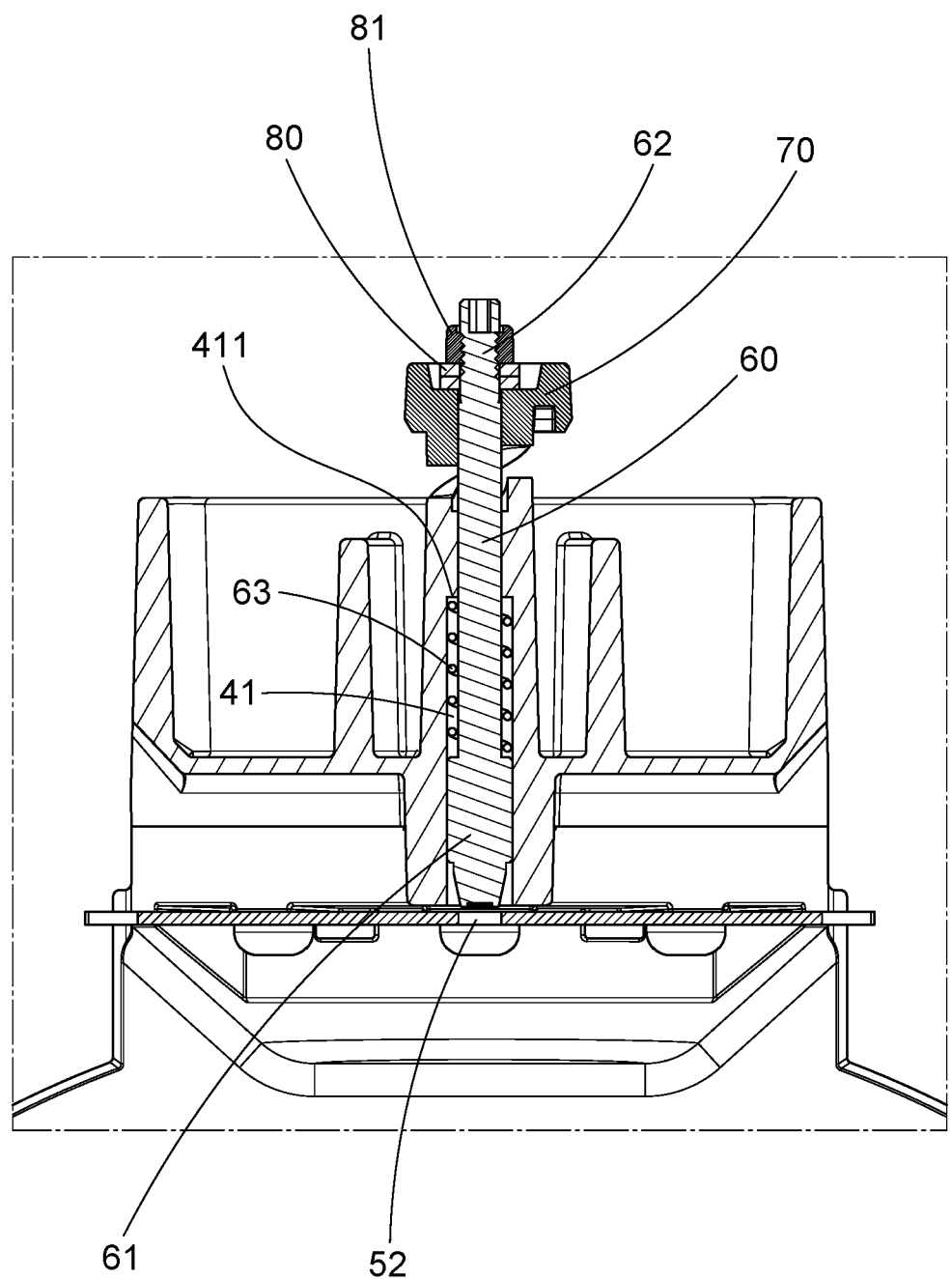
FIG. 10A is a detailed view of the rectangular area 10A of FIG. 10.

The locked position of the bevel post 40 is discussed below by referring to FIGS. 6 to 8A again. The rod 71 is stopped at the first position of the structural member 42 (see FIG. 6) and the head of the shaft 60 is in the central aperture 52 (see FIG. 8A).

Figure 11:
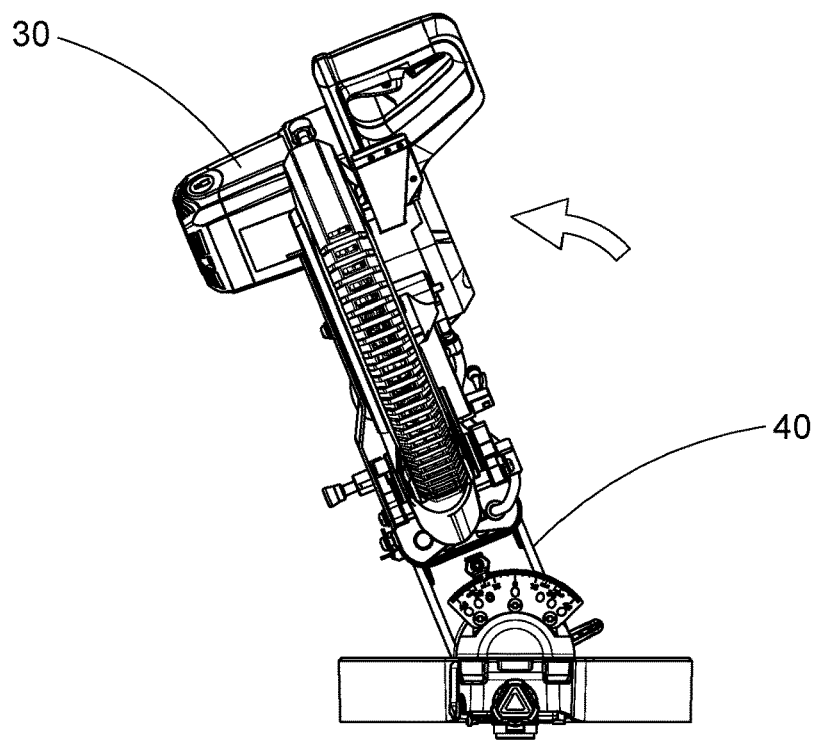
FIG. 11 schematically shows the support assembly pivoted to the left in the unlocked position.
Figure 11A:
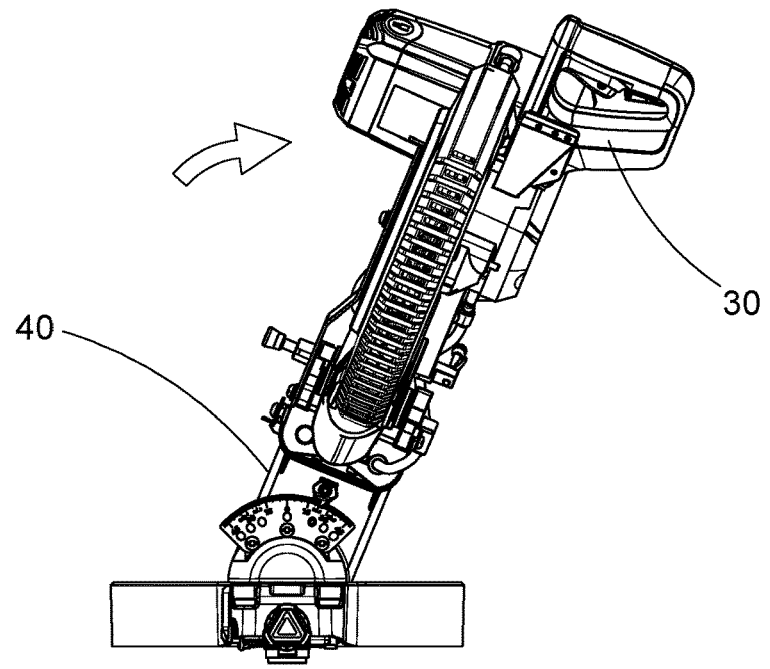
FIG. 11A schematically shows the support assembly pivoted to the right in the unlocked position.

Unlocking of the bevel post 40 is discussed below by referring to FIGS. 9 to 11A again. A person may clockwise turn the activation handle 70 until the rod 71 is stopped at the second position of the structural member 42. In the locking process, the projection 73 clears the complementary member 43 to push the activation handle 70 away from the bevel post 40 with the torsion spring 63 being compressed and the head of the shaft 60 clears the central aperture 52. Then the person may clockwise pivot the bevel post 40 (see FIG. 11) or clockwise pivot the bevel post 40 (see FIG. 11A) until the shaft 60 is aligned with the desired aperture 52. Thereafter, the person may turn the activation handle 70 to the position of FIG. 6 and the energized torsion spring 63 pushes the head of the shaft 60 into the desired aperture 52 to lock the shaft 60.

Figure 12:
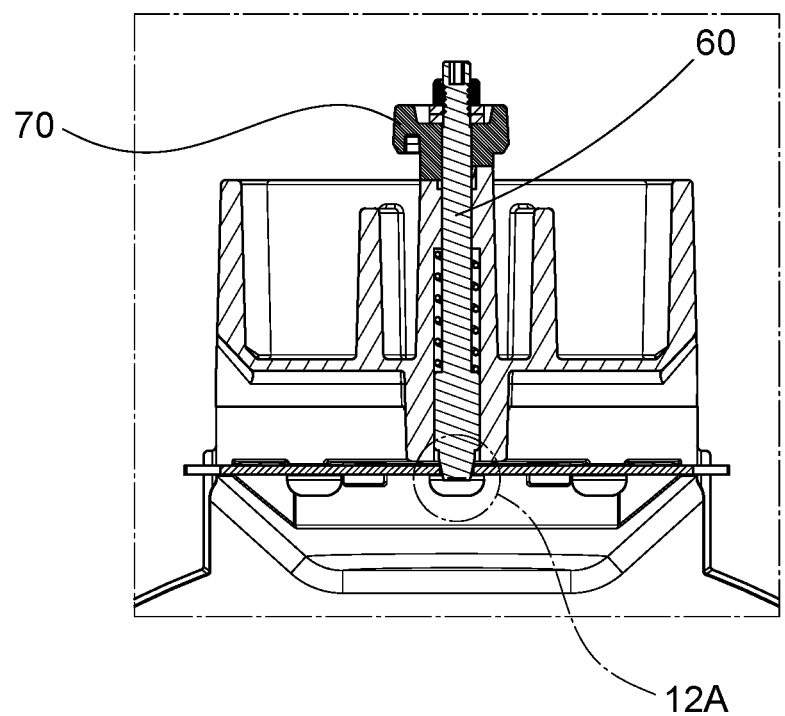
FIG. 12 is a view similar to FIG. 10A showing the shaft being not correctly disposed in the aperture in the locked position due to wear.
Figure 12A:
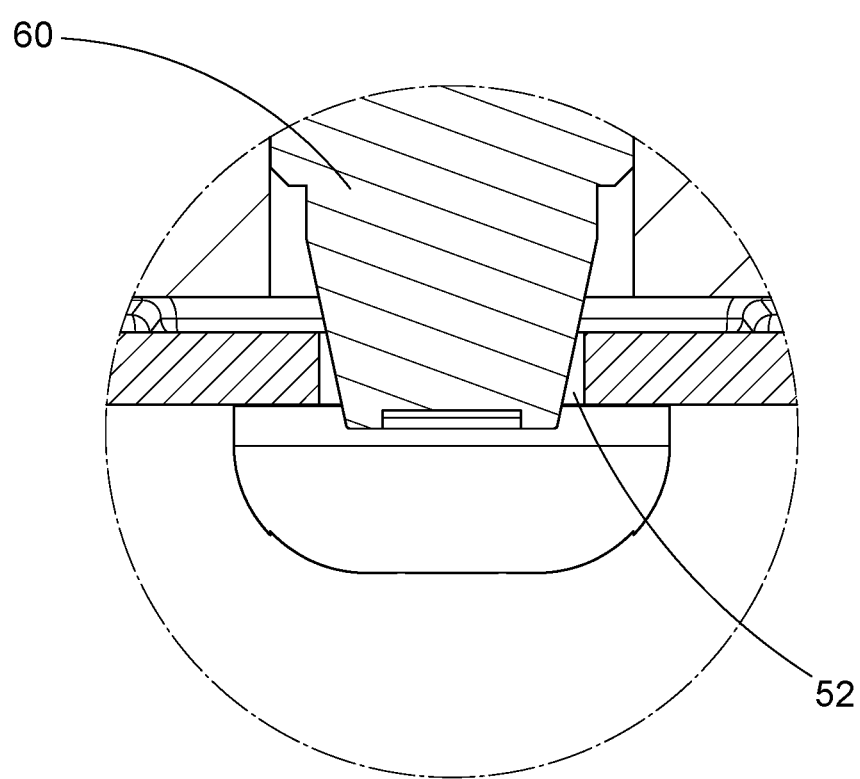
FIG. 12A is a detailed view of the circular area 12A of FIG. 12.
Figure 13:
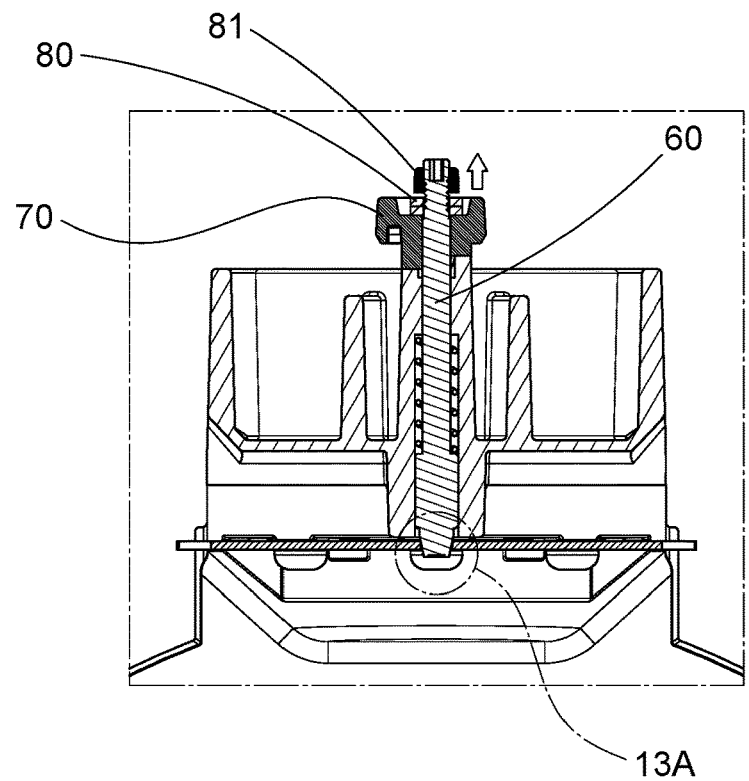
FIG. 13 is a view similar to FIG. 12 showing the shaft being moved to the locked position by slightly unfastening the adjustable nut.
Figure 13A:
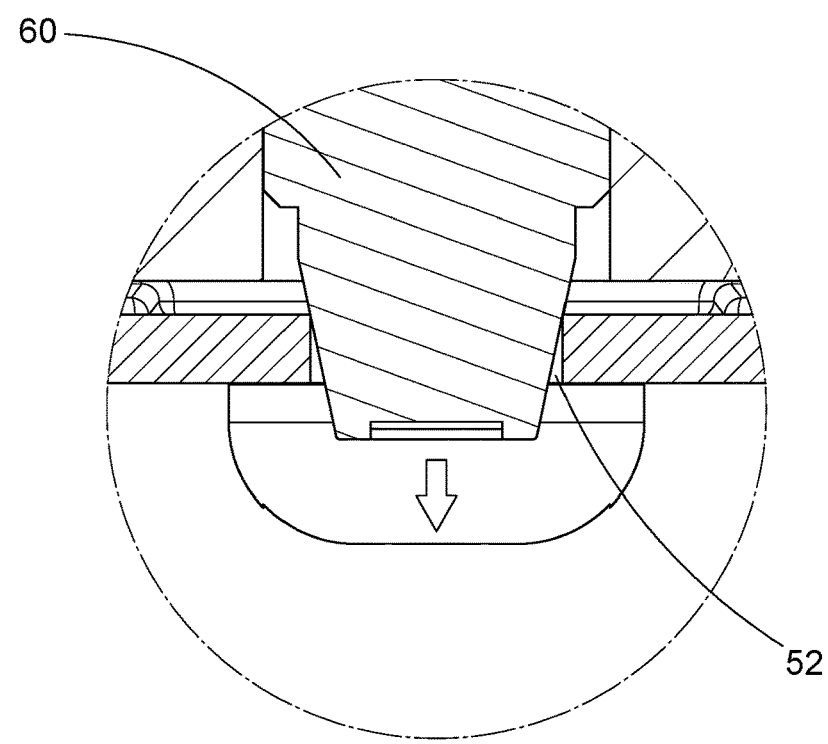
FIG. 13A is a detailed view of the circular area 13A of FIG. 13.

As shown in FIGS. 12 to 13A specifically, after many times of use the head of the shaft 60 may be not in the desired aperture 52 in the locked position due to wear. At this time, the user may slightly unfasten the adjustable nut 81 to disengage from the washer 80 and drive the head of the shaft into the aperture 52 for positioning.

While the invention has been described in terms of preferred embodiments, those skilled in the art will recognize that the invention can be practiced with modifications within the spirit and scope of the appended claims.

What is claimed is:

1. A power miter saw, comprising:
    a base;
    a turntable configured to adjustably rotate on the base;
    a support assembly configured to support a rotatable circular saw blade disposed in a blade guard;
    a curved graduated board disposed on the turntable and including a plurality of apertures spaced along a top edge;
    a bevel post secured to the support assembly and pivotably connected to one end of the base, the bevel post including a pointer pointed at a center of the top edge of the curved graduated board, a stepped-diameter channel, a structural member, and a complementary member in the structural member;
    a shaft having a head and including an enlargement proximate the head, and a threaded end wherein the shaft is inserted through the stepped-diameter channel with the head disposed in one of the apertures;
    a biasing member put on an intermediate portion of the shaft and having one end urging against a shoulder of the stepped-diameter channel and the other end urging against the enlargement;
    an activation handle including a rod configured to pivotably move between a first position of the structural member and a second position of the structural member, a pivot hole with the threaded end passing through, and a projection engaged with the complementary member in a locked position; and
    an adjustable nut threadedly secured to the threaded end.

2. The power miter saw of claim 1, wherein the activation handle further comprises a cavity and a washer put on the shaft and positioned in the cavity, and wherein the adjustable nut is spaced from the washer by a predetermined distance and configured to rotatably move to urge against the washer.

3. The power miter saw of claim 1, wherein the rod is stopped at the first position of the structural member in the locked position.

4. The power miter saw of claim 1, wherein the rod is stopped at the second position of the structural member and the projection clears the complementary member to push the activation handle away from the bevel post in an unlocked position.

\* \* \* \* \*